Patented May 7, 1935

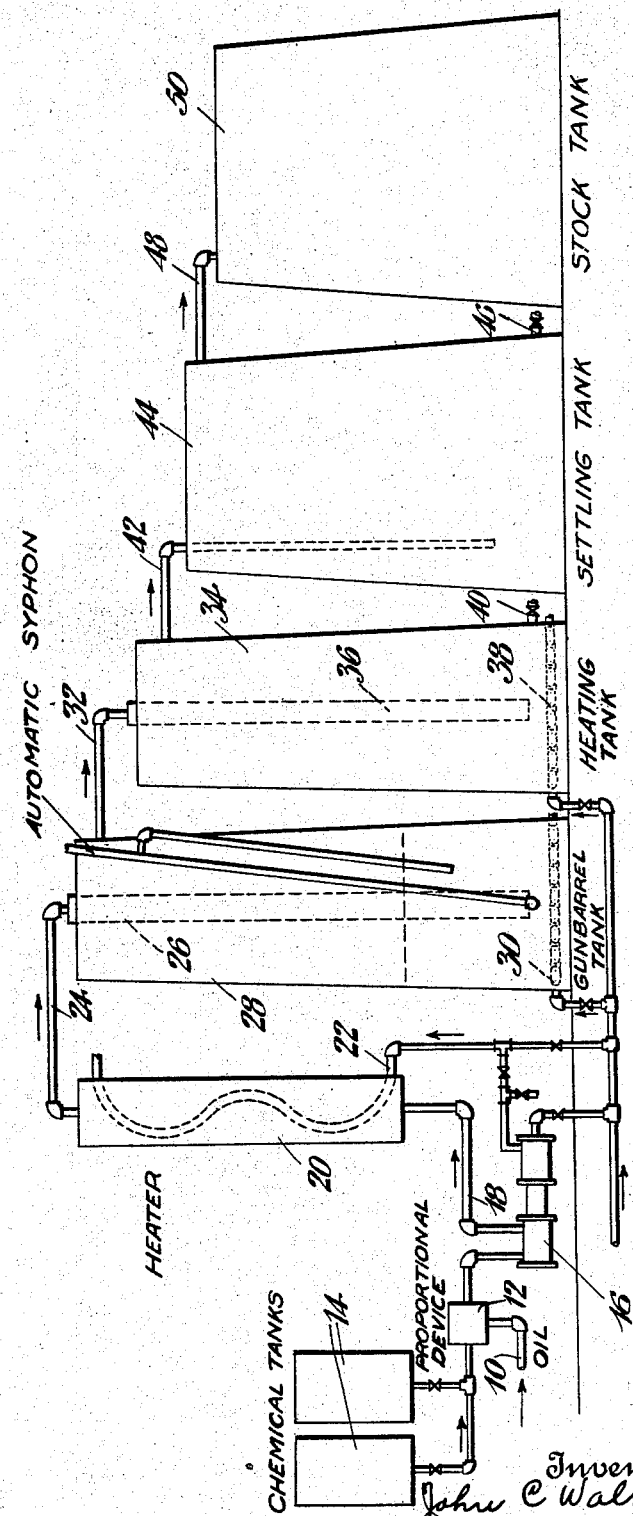

2,000,802

UNITED STATES PATENT OFFICE 2,000,802

BREAKING OF OIL-WATER EMULSIONS

John Charles Walker, Eldorado, Kans., assignor, by mesne assignments, to The Tretolite Company, Webster Groves, Mo., a corporation of Missouri Application September 2, 1921, Serial No. 498,078

16 Claims. (Cl. 196—4)

This invention relates to the breaking of oil-water emulsions, and more particularly to a method of treating petroleum oil containing emulsion of oil and water to break the emulsion and separate the water from the oil.

The petroleum oil producing strata in most localities have water or brine associated with the oil. When the brine is agitated with the oil, as is commonly done by pumps, particularly defectively operating pumps, an oil-water emulsion is formed. The brine forms the disperse phase of the emulsion, and is distributed in the oil as particles varying in size from large drops to those of microscopic size, the particles being surrounded by films of oil.

The presence of emulsions in petroleum oil is undesirable because the wet oils or oils containing emulsions cannot be distilled or refined with the water in them. The presence of water in oil undergoing distillation causes the stills to froth and thus contaminates the distillates. Accordingly, the refineries and the pipe line companies refuse to buy oil which has more than a predetermined amount of a water-in-oil emulsion therein.

The water-in-oil emulsions formed from petroleums in different localities vary quite widely, and many different treatments have been used to break the different emulsions. The theory has been presented that the difference in emulsions is due to the difference in chemical compositions of the brines associated with the oils. There appears to be no doubt that the constituents of brine, particularly magnesium and calcium chlorides, tend to form permanent emulsions, but tests have shown that some oils will form a permanent emulsion with brine containing a low calcium and magnesium content as readily as with a brine containing a high calcium and magnesium content, while other oils will form permanent emulsion with either of these brines with great difficulty.

When relying upon the theory that the difference in emulsions depends upon different characters of brines in the emulsions, certain chemical treatments of the wet oil have been used to break the emulsions. The chemical reagents are alleged to have water softening properties, and when they are brought into contact with the emulsions they are supposed to precipitate the salts in the brine and break down the disperse phase of the emulsions. Different chemical reagents therefore have been used to procipitate the salts, in accordance with the different characters of the brines in the emulsions. Experiments tend to show, however, that permanent emulsions may be made by agitating oil with distilled water, or, with a salt solution which does not contain alkaline earth salts. Moreover, practically all brines associated with petroleum oils contain a sufficient quantity of salts such as the chlorides, sulphates and carbonates of calcium and magnesium, to form permanent emulsions with some kinds of oils. Also, many of the emulsions contain brines of approximately the same calcium and magnesium contents, but they vary quite widely in their resistance to breaking or splitting treatment. These facts appear to indicate that the difference in emulsions formed in different localities depends more on the different characters of the oils than upon the different characters of the brines associated with the oils.

The object of the present invention is to provide a method by which water-in-oil emulsions may be effectively broken, irrespective of the nature of oils and brines of which the emulsions are formed.

To dehydrate oil in accordance with the present invention, the wet oil is thoroughly mixed with a water mixture of benzene sulpho stearic acid, which mixture is preferably in the form of an emulsion. The mixture is then allowed to stratify and the water removed from the oil. Dehydration may be carried out at prevailing atmospheric temperatures, but it is preferred to heat the wet oil to a temperature of from 90° F. to 150° F. when it is being mixed with the benzene sulpho-stearic acid because heat increases the effectiveness of the treating agent, decreases the viscosity of the oil, aids in lowering the surface tension of the water, and decreases the time required for stratification.

In the accompanying drawing is diagrammatically illustrated an apparatus in which the preferred method of the invention may be carried out.

To carry out the method above referred to in the apparatus shown in the drawing, oil containing a water-in-oil emulsion is led in through a pipe 10 and passes into a proportionating device 12 where it is mixed with a predetermined quantity of benzene sulpho-stearic acid that is introduced from one of a pair of chemical tanks 14. The mixture of the wet oil and the benzene sulpho-stearic acid is then carried by means of a pump 16 through a pipe 18 into a heater 20. The oil is heated in the heater 20 by means of steam admitted through a line 22 and the exhaust steam from the pump 16 may be also passed into the heater 20. From the heater 20 the mixture of the wet oil and the treating reagent flows through a pipe 24 into a distributor 26, by which it is introduced into the bottom of a gun barrel tank 28. The materal in the gun barrel tank is heated by means of a steam coil 30 which is supplied with steam from the pipe 22. The action of the heat and the benzene sulpho-stearic acid upon the oil tends to break the emulsion and stratification occurs in the gun barrel tank, the brine settling to the bottom of the tank, and the oil and any unbroken emulsion arising to the top of the tank. The brine separating in the tank 28 is continuously drawn off through an automatic siphon, and the mixture of oil and emulsion leaves the top of the gun barrel tank through a pipe 32 and passes into the bottom of a heating tank 34 through a distributor 36. The mixture of wet oil and the treating reagent is further heated in the heating tank 34 by means of a steam coil 38, and further stratification of the oil and the emulsion takes place. The water set free may be drawn off through an outlet 40, and unbroken emulsion, together with the oil, passes out of the top of the tank 34 through a pipe 42, and is introduced into the bottom of a settling tank 44. By the time the oil has reached the tank 44 the heat and the treating agent have broken down substantially all of the emulsion in the oil and the mixture of oil and water stratifies in the tank 44. The water may be drawn off through an outlet 46 and the clear oil flows off from the top of the tank 44 through a pipe 48, and may then pass to a storage or stock tank 50.

With the apparatus outlined above it will be seen that oil may be continuously pumped through the treating apparatus and be continuously dehydrated. Although it is preferred to use such a continuous process, it is not necessary that the apparatus shown in the drawing be used to obtain an effective dehydration of the oil, but any suitable apparatus may be used by which the benzene sulpho-stearic acid may be thoroughly mixed with the oil and the treated oil allowed to stratify to separate the water or brine therefrom. The benzene sulpho-stearic acid may be prepared in many different ways, but it is preferred to prepare this reagent by mixing oleic acid with benzene in the ratio of three parts of acid to $3\frac{5}{16}$ parts of benzene, and the resulting solution is then treated at ordinary temperatures with concentrated sulphuric acid in the ratio of four parts of sulphuric acid to three parts of the fatty acid by weight. The sulphuric acid is slowly added to the benzene-oleic acid mixture, while the solution is being constantly agitated, and the temperature of the solution is controlled to prevent sulphur dioxide from being liberated from the solution. When the sulphuric acid is completely absorbed the mass is washed one or more times with water and is then in condition to be used for treating water-in-oil emulsion. This aromatic sulpho fatty acid is only slightly soluble in water and will form an emulsion with water. It is a heavy reddish brown viscous oil having an aromatic odor, and is quite stable. In place of the oleic acid the commercial red oil and also olive or palm oil may be used.

Various experiments have shown that the benzene of the aromatic sulpho fatty acid may be replaced by toluol, xylol, phenol, or naphthalene. The aromatic radical of the toluol, xylol, phenol, or naphthalene is attached to the sulpho fatty acid in the same manner that the benzene radical is attached thereto, and the reagents containing these aromatics may be made in the same manner that the benzene sulpho fatty acid is made. All of these aromatic compounds are effective in breaking emulsions, but it is preferred to use the benzene sulpho fatty acid because it has a stronger dehydrating effect. It is also easier to handle and is cheaper to manufacture.

The quantity of the reagent which must be used in breaking emulsion depends entirely upon the character of the emulsion. If the emulsion is recently formed it seems to break much more readily than an emulsion which has been standing in the air or in the bottom of an oil tank for a considerable period. The concentrated benzene sulpho fatty acid will break the most stubborn petroleum emulsions when used in the amount of one-half per cent by volume of the volume of the emulsion being treated. Other forms of emulsion may be effectively broken when using one part of the reagent to from 500 to 700 parts of the emulsion. Therefore depending upon the nature of the oil and the nature of the emulsion, the reagent will be used in the proportion of from $\frac{1}{10}$ of one per cent to $\frac{1}{5}$ of one per cent by volume of the volume of emulsion to be treated.

The action of the aromatic sulpho fatty acid in breaking the oil-water emulsions appears to be more of a physical or a physical chemical nature than a true chemical reaction. Experiments indicate that the oil-water emulsion has the brine for the disperse phase. The aromatic sulpho fatty acid will form an emulsion with water in which the fatty acid is the disperse phase. The disperse phase of the water-in-oil emulsion has a negative charge and the disperse phase of the fatty acid-water emulsion appears to have a positive charge. The treating reagent therefore appears to act to neutralize the electrical charge of the water-in-oil emulsion and allow the water to coalesce. The aromatic fatty acid also appears to give a marked change in the surface tension of the oil-water interface which disturbs the equilibrium existing between the continuous and the disperse phases, and consequently tends to break the emulsion.

It is possible also that the presence of the ionized aromatic sulpho fatty acid acts as a catalyst in destroying the equilibrium of the emulsion, and thus causes the emulsion to break down. Sulpho fatty acids have been shown by Ernst Twitchell to have a catalytic reaction when splitting fats to form glycerine and set free of fatty acid, and it may be that the sulpho acids act in a similar manner in breaking down emulsions.

Experiments would appear to prove that the breaking of emulsions by the process described above does not depend upon the presence of or the chemical action on alkali earth salts. The benzene sulpho-stearic acid is not a water softening agent, it does not break an emulsion by reason of the removal by precipitation of the calcium and magnesium salts, and the presence of alkaline earth salts in the emulsion has no special significance in the application of the process.

While it is believed that the breaking of the oil-water emulsion with the aromatic sulpho fatty acid is dependent on an action of a physical nature, rather than upon a chemical nature, it is to be understood that the invention is not based, dependent upon, or limited to any theory except as specifically defined in the accompanying claims.

In the claims the emulsions are referred to as comprising oil and water. By the term "water" it is intended to include the various brines or water solutions which are associated with oils in the petroleum industry to form emulsions. Also in referring to the benzene sulpho-stearic acid, it is not to be understood that this acid is chemically pure. The dehydration process does not require the use of chemically pure reagents, and preferably, the commercial constituents are used in the manufacture of benzene sulpho-stearic acid. No attempt is made to separate the benzene sulpho-stearic acid from any by-product formed in the reaction, and therefore the material which can be effectively used in the process may contain small amounts of unchanged or partially changed oleic acid, benzol and sulphuric acid. In defining the treating reagent as "benzene sulpho-stearic acid," it is not to be understood that this is the exact structure of the reaction product of the benzene sulphuric acid and oleic acid used in making the reagent.

Commercial or crude benzene contains small amounts of phenol, toluene and other impurities. Commercial or crude phenol contains cresols. Commercial or crude naphthalene contains not only naphthalene but also naphthalene homologues including mono- and di-methyl naphthalenes, ethyl naphthalenes, as well as diphenyl, indene, acenaphthene, cresols and other phenolic bodies, and quinoline bases.

Twitchell (above referred to) has shown that when concentrated sulfuric acid in excess acts on a mixture of a detergent-forming or soap-forming material, such as a fatty acid or a fatty oil, (fatty oils such as commercial red oil, olive oil, palm oil and the like,—consisting chiefly of fatty acid glycerides or esters), and a member of the aromatic series, such as naphthalene (polycyclic), benzene (non-hydroxy mono-cyclic), phenol (hydroxy mono-cyclic) etc., a partial union or condensation takes place between the aromatic, the detergent-forming material, and the sulfuric acid. The sulfuric acid acts as a sulfonating, condensing and dehydrating agent. The product of the reaction has been shown by Twitchell to consist of a complex mixture comprising a condensation product containing,—in chemically combined form,—an aromatic group, a sulfonic group or groups and a detergent-forming group. (Such condensation product may be broadly characterized as a modified fatty body, such as the benzene sulfo-stearic acid above described); unacted on detergent-forming or fatty materials (for example commercial oleic acid); unacted on aromatic bodies (for example commercial benzene and phenol); sulfuric acid; and other more or less complex by-products of the reaction, including fatty material such as oxystearic acid and fatty anhydrides, sulfo fatty acids, such as stearo-sulfuric acid, and aromatic sulfonic acids such as benzene sulfonic acid and naphthalene sulfonic acid. (See pages 22 to 26 of the Journal of the American Chemical Society, 1900; and U. S. patents to Twitchell 601,603; 628,503; 844,426; 918,612; 1,082,662 and 1,170,468.

The dehydration of oil referred to in the present specification is used in its commonly accepted significance, i. e., the separation of water from oil. This dehydration action is effected by the deemulsifying effect of the treating agents which break the water-in-oil emulsion and allow the water to settle from the oil, the actual separation taking place by stratification or skimming.

The preferred form of the invention having been thus described, what is claimed as new is:

1. A method of breaking emulsions of water-in-oil comprising mixing therewith the mixture of reaction products resulting from the sulfonation of a mixture of substantially equal proportions of commercial benzene and commercial oleic acid.

2. A method of breaking emulsions of water-in-oil comprising mixing therewith benzene sulfo-stearic acid admixed with small amounts of the other materials resulting from the sulfonation — at temperatures below the temperature at which sulfur dioxide is liberated from solution,—of a mixture of commercial benzene and commercial oleic acid.

3. A method of breaking emulsions of water-in-oil comprising mixing therewith a reagent containing benzene sulfo-stearic acid, benzene, oleic acid and other products formed during the sulphonation of a mixture of commercial benzene and commercial oleic acid, said reagent containing substantially no free mineral acid.

4. A method of breaking emulsions of water-in-oil comprising mixing therewith the reaction product of the incomplete sulphonation of a mixture of commercial benzene and commercial oleic acid.

5. A process for breaking petroleum emulsions, characterized by subjecting the emulsion to the action of a demulsifying agent consisting of a mixture comprising a condensation product of a fatty body and a non-hydroxy-mono-cyclic aromatic group, and other complex bodies.

6. A process for breaking or separating petroleum emulsions, characterized by subjecting the emulsion to the action of a treating agent consisting of a mixture comprising a condensation product containing a sulpho-aromatic, soap-forming acid and other complex organic bodies, produced by sulphonating a mass composed of an organic soap-forming acid and an aromatic compound in which the proportion of aromatic molecules to soap-forming molecules is greater than the ratio of one to one.

7. A process for breaking or separating petroleum emulsions, characterized by subjecting the emulsion to the action of a treating agent consisting of a mixture comprising a condensation product containing a sulpho-aromatic, soap-forming acid and other complex organic bodies, produced by sulphonating a mass composed of a fatty acid and an aromatic compound in which the proportion of aromatic molecules to fatty acid molecules is greater than the ratio of one to one.

8. A process for breaking petroleum emulsions, characterized by subjecting the emulsion to the action of a demulsifying agent comprising a crude reaction mixture containing a condensation product of a fatty detergent-forming group, a mono-cyclic aromatic group, and a sulfonic group or groups.

9. A process for breaking petroleum emulsions, characterized by subjecting the emulsion to the action of a demulsifying agent consisting of a mixture containing a condensation product of an organic detergent-forming group and an aromatic group, and other complex bodies produced by sulfonating a mixture of an organic detergent-forming compound and an aromatic compound.

10. A process for breaking petroleum emulsions, characterized by subjecting the emulsion to the action of a demulsifying agent comprising a crude reaction mixture containing a condensation product of a phenol group chemically combined with a soap-forming radical.

11. A process for breaking petroleum emulsions, characterized by subjecting the emulsion to the action of a demulsifying agent, comprising a mixture consisting of a condensation product containing a sulfo aromatic soap-forming group, and other complex organic bodies produced by sulfonating a mixture of an aromatic compound and a soap-forming body.

12. A process for breaking petroleum emulsions, characterized by subjecting the emulsion to the action of a demulsifying agent comprising a condensation product containing an aromatic fatty group, and other complex organic bodies formed by interaction between a fatty compound, an aromatic compound and sulphuric acid.

13. A process for breaking petroleum emulsions, characterized by subjecting the emulsion to the action of a demulsifying agent, consisting of a mixture of a substantial quantity of a sulfo-aromatic fatty compound and other fatty and aromatic bodies.

14. A process for breaking petroleum emulsions, characterized by subjecting the emulsion to the action of a demulsifying agent consisting of a mixture containing a fatty acid, a sulfo aromatic, a sulfo aromatic fatty acid, and a nonsulfonated aromatic substance.

15. A process for breaking or separating petroleum emulsions, characterized by subjecting the emulsion to the action of a treating agent consisting of a mixture comprising a condensation product containing a sulpho-aromatic, soap-forming acid and other complex bodies, produced by subjecting an organic soap-forming acid in which the carboxyl group is blocked and non-reactive, to the action of an aromatic in the presence of a sulphonating agent.

16. A process of breaking or separating petroleum emulsions, characterized by subjecting the emulsion to the action of a treating agent consisting of a mixture comprising a condensation product containing a sulpho-aromatic, soap-forming acid and other complex bodies, produced by subjecting a fatty acid in which the carboxyl group is blocked and non-reactive, to the action of an aromatic in the presence of a sulphonating agent.

JOHN CHARLES WALKER.